(12) United States Patent
Cline et al.

(10) Patent No.: US 10,067,644 B2
(45) Date of Patent: *Sep. 4, 2018

(54) GRAPHICAL USER INTERFACES FOR MANAGING HIERARCHICAL SYSTEMS

(71) Applicant: International Business Machines Corporation, Armonk, NY (US)

(72) Inventors: Susan L. Cline, Oakland, CA (US); Trenten F Peterson, Kaysville, UT (US)

(73) Assignee: International Business Machines Corporation, Armonk, NY (US)

( * ) Notice: Subject to any disclaimer, the term of this patent is extended or adjusted under 35 U.S.C. 154(b) by 346 days.

This patent is subject to a terminal disclaimer.

(21) Appl. No.: 14/867,378

(22) Filed: Sep. 28, 2015

(65) Prior Publication Data

US 2017/0090689 A1    Mar. 30, 2017

(51) Int. Cl.
G06F 3/048    (2013.01)
G06F 3/0482   (2013.01)
G06F 3/0484   (2013.01)
G06F 3/0481   (2013.01)

(52) U.S. Cl.
CPC .......... *G06F 3/0482* (2013.01); *G06F 3/0481* (2013.01); *G06F 3/04842* (2013.01); *G06F 3/04847* (2013.01)

(58) Field of Classification Search
CPC .. G06F 3/0481; G06F 3/0482; G06F 3/04842; G06F 3/0484; G06F 9/4443
See application file for complete search history.

(56) References Cited

U.S. PATENT DOCUMENTS

| | | |
|---|---|---|
| 5,500,934 A | 3/1996 | Austin et al. |
| 5,603,034 A | 2/1997 | Swanson |
| 5,778,222 A | 7/1998 | Herrick et al. |
| 5,983,234 A | 11/1999 | Tietjen et al. |
| 6,052,688 A | 4/2000 | Thorsen |
| 6,317,142 B1 | 11/2001 | Decoste et al. |

(Continued)

OTHER PUBLICATIONS

Cline et al., "Graphical User Interfaces for Managing Hierarchical Systems", U.S. Appl. No. 15/086,307, filed Mar. 31, 2016, 37 pages.

(Continued)

*Primary Examiner* — Tuyetlien T Tran
(74) *Attorney, Agent, or Firm* — Bryan D. Wells

(57) ABSTRACT

A graphical user interface for managing hierarchical systems is provided. A graphical user interface that includes a navigation bar having a domain element and a plurality of object elements is presented. The object elements are associated with different object types in a hierarchical system and are arranged based, at least in part, on the hierarchical system. A first menu that includes a list of objects of a first object type is presented in response to detecting an interaction with a first object element. Information presented on a second object element is filtered in response to a selection of a specific object via the first menu. A second menu that includes a list of all objects that are associated with the plurality of object elements is presented in response to detecting an interaction with the domain element while continuing to filter the information presented on the second object element.

3 Claims, 10 Drawing Sheets

(56) References Cited

U.S. PATENT DOCUMENTS

| | | |
|---|---|---|
| 6,356,910 B1 | 3/2002 | Zellweger |
| 6,684,388 B1 | 1/2004 | Gupta et al. |
| 6,701,311 B2 | 3/2004 | Biebesheimer et al. |
| 6,816,175 B1 | 11/2004 | Hamp et al. |
| 8,185,824 B1 | 5/2012 | Mitchell et al. |
| 8,738,414 B1 | 5/2014 | Nagar et al. |
| 9,348,489 B1 | 5/2016 | Cline et al. |
| 9,465,511 B1 | 10/2016 | Cline et al. |
| 2002/0105550 A1 | 8/2002 | Biebesheimer et al. |
| 2002/0156879 A1 | 10/2002 | Delany et al. |
| 2003/0105771 A1 | 6/2003 | Tiefenbrun et al. |
| 2004/0090459 A1 | 5/2004 | Hsu |
| 2004/0215649 A1 | 10/2004 | Whalen et al. |
| 2004/0215650 A1 | 10/2004 | Shaji et al. |
| 2006/0136138 A1 | 6/2006 | Hicklin et al. |
| 2006/0167858 A1 | 7/2006 | Dennis et al. |
| 2006/0173808 A1 | 8/2006 | Peterson et al. |
| 2006/0206837 A1* | 9/2006 | Steiner .................. G06F 9/4443 715/854 |
| 2013/0300747 A1* | 11/2013 | Wong .................... G06T 11/206 345/440.2 |
| 2014/0244620 A1* | 8/2014 | Bertram ............ G06F 17/30554 707/722 |

OTHER PUBLICATIONS

Appendix P, List of IBM Patents or Patent Applications Treated as Related, 2 pages, dated Apr. 6, 2016.

Cline et al., "Graphical User Interfaces for Managing Hierarchical Systems", U.S. Appl. No. 15/415,950, filed Jan. 26, 2017, 37 pages.

Appendix P, List of IBM Patents or Patent Applications Treated as Related, 2 pages, dated Jan. 26, 2017.

Software Patent Institue et al., "Monitoring System Behavior in a Complex Computational Environment", An IP.com Prior Art Database Technical Disclosure, Original Publication Date: Dec. 31, 1979, IP.com No. 000128905, IP.com Electronic Publication: Sep. 20, 2005, © ; Copyright 1979 by Xerox Corporation, pp. 1-106.

Cline et al., "Graphical User Interfaces for Managing Hierarchical Systems", U.S. Appl. No. 14/970,601, filed Dec. 16, 2015, 37 pages.

Appendix P, List of IBM Patents or Patent Applications Treated as Related, 2 pages, dated Dec. 18, 2015.

* cited by examiner

GRAPHICAL USER INTERFACES FOR MANAGING HIERARCHICAL SYSTEMS

TECHNICAL FIELD

The present invention relates generally to the field of graphical user interfaces and, more particularly, to graphical user interfaces for managing hierarchical systems.

BACKGROUND

System administrators are responsible for the upkeep, configuration, and reliable operation of computer systems. In general, system administrator seeks to ensure that the uptime, performance, resources, and security of the computers that they manage meet the needs of users. There are many types of system administrators. Types of system administrators include database administrators, network administrators, security administrators, and storage administrators.

Some system administrators manage computer systems using graphical user interfaces. A graphical user interface (GUI) is a type of interface that allows users to interact with electronic devices through graphical icons and visual indicators as opposed to text-based interfaces, typed command labels, or text navigation. In general, direct manipulation of the graphical elements of a GUI can enable a system administrator to view information concerning various aspects of the computer system being managed or perform various actions on the computer system. For example, a GUI can include one or more widgets that allow for interactions that are appropriate to the kinds of data and/or component(s) that are associated with the widgets. Large widgets, such as windows, usually provide a frame or container for "primary" content being displayed on a GUI (e.g., a frame or container for a graphical representation of a computer system, an electronic message, a graph, or an image). In general smaller widgets, such as buttons or menus, are tools for user inputs.

SUMMARY

According to one embodiment of the present invention, a method for managing a hierarchical system via a graphical user interface is provided. The method includes: presenting, by one or more computer processors, a graphical user interface that includes a navigation bar, the navigation bar including a domain element and a plurality of object elements, wherein each object element is associated with a different object type in a hierarchical system and wherein the plurality of object elements is arranged in an order based, at least in part, on the hierarchical system; presenting, by one or more computer processors, a first menu in response to detecting an interaction with a first object element of the plurality of object elements, wherein the first object element is associated with a first object type in the hierarchical system and wherein the first menu includes a list of objects of the first object type; filtering, by one or more computer processors, information presented on a second object element of the plurality of object elements in response to receiving a selection of a specific object via the first menu, wherein the second object element is associated with a second object type, and wherein information pertaining to one or more objects that are related to the specific object and of the second object type is presented on the second object element as a result of the filtering; and presenting, by one or more computer processors, a second menu in response to detecting an interaction with the domain element while continuing to filter information presented on the second object element, wherein the second menu includes a list all objects that are associated with the plurality of object elements.

According to another embodiment of the present invention, a computer program product for managing a hierarchical system via a graphical user interface is provided. The computer program product comprises a computer readable storage medium and program instructions stored on the computer readable storage medium. The program instructions include: program instructions to present a graphical user interface that includes a navigation bar, the navigation bar including a domain element and a plurality of object elements, wherein each object element is associated with a different object type in a hierarchical system and wherein the plurality of object elements is arranged in an order based, at least in part, on the hierarchical system; program instructions to present a first menu in response to detecting an interaction with a first object element of the plurality of object elements, wherein the first object element is associated with a first object type in the hierarchical system and wherein the first menu includes a list of objects of the first object type; program instructions to filter information presented on a second object element of the plurality of object elements in response to receiving a selection of a specific object via the first menu, wherein the second object element is associated with a second object type, and wherein information pertaining to one or more objects that are related to the specific object and of the second object type is presented on the second object element as a result of the filtering; and program instructions to present a second menu in response to detecting an interaction with the domain element while continuing to filter information presented on the second object element, wherein the second menu includes a list all objects that are associated with the plurality of object elements.

According to another embodiment of the present invention, a computer system for managing a hierarchical system via a graphical user interface is provided. The computer system includes one or more computer processors, one or more computer readable storage media, and program instructions stored on the computer readable storage media for execution by at least one of the one or more processors. The program instructions include: program instructions to present a graphical user interface that includes a navigation bar, the navigation bar including a domain element and a plurality of object elements, wherein each object element is associated with a different object type in a hierarchical system and wherein the plurality of object elements is arranged in an order based, at least in part, on the hierarchical system; program instructions to present a first menu in response to detecting an interaction with a first object element of the plurality of object elements, wherein the first object element is associated with a first object type in the hierarchical system and wherein the first menu includes a list of objects of the first object type; program instructions to filter information presented on a second object element of the plurality of object elements in response to receiving a selection of a specific object via the first menu, wherein the second object element is associated with a second object type, and wherein information pertaining to one or more objects that are related to the specific object and of the second object type is presented on the second object element as a result of the filtering; and program instructions to present a second menu in response to detecting an interaction with the domain element while continuing to filter information presented on the second object element, wherein the second menu includes a list all objects that are associated with the plurality of object elements.

DETAILED DESCRIPTION

System administrators monitor multiple aspects of hierarchical systems at various levels of granularity. For example, a system administrator may monitor a system at a coarse level of granularity (e.g., monitoring the system as a whole) to detect a problem in the system and then monitor the system at increasingly fine levels of granularity (e.g., monitoring one or more types of objects of the system) to diagnose the problem. Graphical user interfaces are one type of tool that permit a system administrator to monitor the system at various levels of granularity. Embodiments of the present disclosure recognize that is advantageous for a graphical user interface to provide a means for monitoring a hierarchical system at various levels of granularity. Embodiments of the present disclosure also recognize that it is advantageous for the graphical user interface to summarize the health of the hierarchical system at various levels of granularity and eliminate superfluous information where possible. In addition, embodiments of the present disclosure recognize that is advantageous for a graphical user interface to summarize the health of the hierarchical system such that the graphical user interface can present a view that includes the summary and detailed information pertaining to various aspects of the system.

Embodiments of the present disclosure provide a graphical user interface that indicates the health of a hierarchical system at various levels of granularity while being capable of simultaneously displaying information pertaining to a specific object or type of object in the hierarchical system. In addition, the graphical user interface provides a means for a user to quickly navigate to various levels of granularity and select from among objects of the same type. In response to a user selecting a specific object, embodiments of the graphical user interface apply one or more filters such that the graphical user interface indicates the health of only those objects that are subordinate or superordinate (i.e., related) to the selected object.

Figure 1:
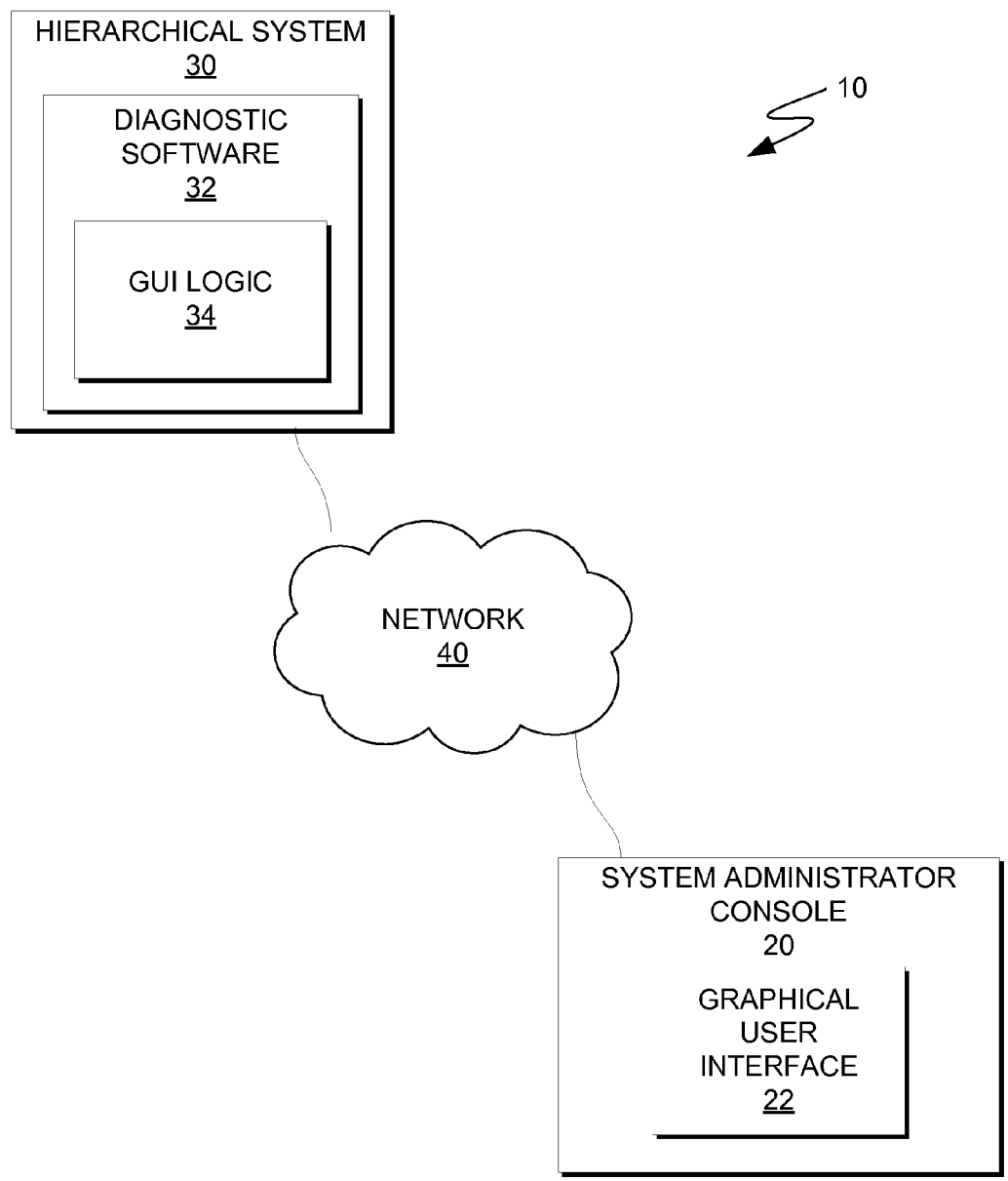
FIG. 1 is a functional block diagram illustrating a computing environment, in accordance with an embodiment of the present disclosure.

Embodiments of the present invention will now be described in detail with reference to the Figures. FIG. 1 is a functional block diagram illustrating a computing environment, in accordance with an embodiment of the present invention. For example, FIG. 1 is a functional block diagram illustrating computing environment 10. Computing environment 10 includes system administrator console 20 and hierarchical system 30 connected over network 40. System administrator console 20 includes graphical user interface 22. Hierarchical system 30 includes diagnostic software 32, which includes GUI logic 34.

In various embodiments, hierarchical system 30 is a computing device that can be a standalone device or a system of one or more types of computing devices, such as one or more servers, mainframes, laptop computers, tablet computers, netbook computers, personal computers (PCs), or desktop computers. In some embodiments, hierarchical system 30 represents a computing system utilizing clustered computers and components to act as a single pool of seamless resources. In general, hierarchical system 30 can be any computing device or a combination of devices with access to graphical user interface 22 on system administrator console 20, and with access to and/or capable of executing diagnostic software 32 and GUI logic 34 such that GUI logic 34 can describe hierarchical system 30 as a combination of one or more types of objects (e.g., processes and/or physical, virtual, or logical components) at various levels of granularity. For example, hierarchical system 30 can be a system for analyzing data streams, as described with respect to FIGS. 3-10, or a hierarchical computer data storage system with various physical locations, arrays, logical volumes, and computer data storage devices. Hierarchical system 30 can include one or more computing devices having internal and external hardware components, as depicted and described in further detail with respect to FIG. 2.

In the embodiment depicted in FIG. 1, diagnostic software 32 and GUI logic 34 are stored on hierarchical system 30. In other embodiments, one or both of diagnostic software 32 and GUI logic 34 can reside on another computing device, provided that each can access and is accessible by each other, and provided that each can access system administrator console 20 and hierarchical system 30. For example, GUI logic 34 can reside on system administrator console 20 and communicate with diagnostic software 32 over network 40. In yet other embodiments, one or both of diagnostic software 32 and GUI logic 34 can be stored externally and accessed through a communication network, such as network 40. Network 40 can be, for example, a system bus, a local area network (LAN), a wide area network (WAN) such as the Internet, or a combination of the aforementioned communication systems, and can include wired, wireless, fiber optic or any other connection known in the art. In general, network 40 can be any combination of connections and protocols that will support communications between system administrator console 20 and hierarchical system 30, in accordance with an embodiment of the present invention.

Diagnostic software 32 operates to collect information pertaining to the objects of hierarchical system 30 (e.g., processes and/or physical, virtual, and/or logical components). In some embodiments, for example, diagnostic software determines a count of processes that successfully completed within a specific time period, a count of processes that completed outside of the specific timer period, and a count or processes that did not complete. Alternatively or in addition to the aforementioned determination, diagnostic software can determine a count of components that are functioning above a performance threshold, a count of components that are functioning below the performance threshold, and a count of components that are nonfunctional. In general, diagnostic software 32 quantifies the performance of the objects of hierarchical system 30.

GUI logic 34 operates in cooperation with graphical user interface 22 to present information pertaining to the relationships and dependencies between, and/or the heath of, the various objects of hierarchical system 30. In various embodiments, GUI logic 34 and graphical user interface 22 represent a model-view-controller architecture, a model-view-presenter architecture, a model-view-adapter architecture, or another architecture for implementing graphical user interfaces. In some embodiments, GUI logic 34 includes (i) a model that defines the data to present, as a view, in graphical user interface 22 and (ii) logic for executing operations on a controller or presenter that modifies the model and the view in response to events in graphical user interface 22 and/or changes in the state of hierarchical system 30. In such embodiments, graphical user interface 22 is a passive interface that communicates user input events (e.g., a hover, a click, or a scroll) to GUI logic 34 and presents the view on system administrator console 20 based, at least in part, on instructions from GUI logic 34. In other embodiments, the logic for executing operations on the controller or presenter resides, at least in part, in graphical user interface 22, wherein graphical user interface 22 communicates, to GUI logic 34, instructions that describe how to modify the model in response to user input events in graphical user interface 22. In yet other embodiments, GUI logic 34 includes logic for executing operations that modify the model in response to changes in the state of hierarchical system 30 and graphical user interface 22 includes logic for executing operations that modify the model in response to user input events in graphical user interface 22.

In various embodiments, system administrator console 20 is an electronic device or collection of electronic devices that presents graphical user interface 22 on a screen and provides a means for a user of system administrator console 20 to interact with graphical user interface 22. In some embodiments, system administrator console 20 is a stand-alone device, a server, a laptop computer, a tablet computer, a netbook computer, a personal computer (PC), a desktop computer, a personal digital assistant (PDA), a smart phone, or any programmable electronic device capable of presenting graphical user interface 22, receiving user inputs, and communicating with hierarchical system 30 via network 40. In other embodiments, system administrator console 20 is physically integrated with a computing device of hierarchical system 30 over a bus (i.e., communications fabric 108 in FIG. 2) and represents one or more displays and one or more input devices, such as a mouse and keyboard, of hierarchical system 30 (i.e., display 118 and external device(s) 116 in FIG. 2). In such embodiments, GUI logic 34 includes the functionality attributed to graphical user interface 22. In general, system administrator console 20 can be any computing device or a combination of devices that has access to diagnostic software 32 and GUI logic 34 and that is capable of presenting graphical user interface 22 and facilitating user interaction with graphical user interface 22.

Figure 2:
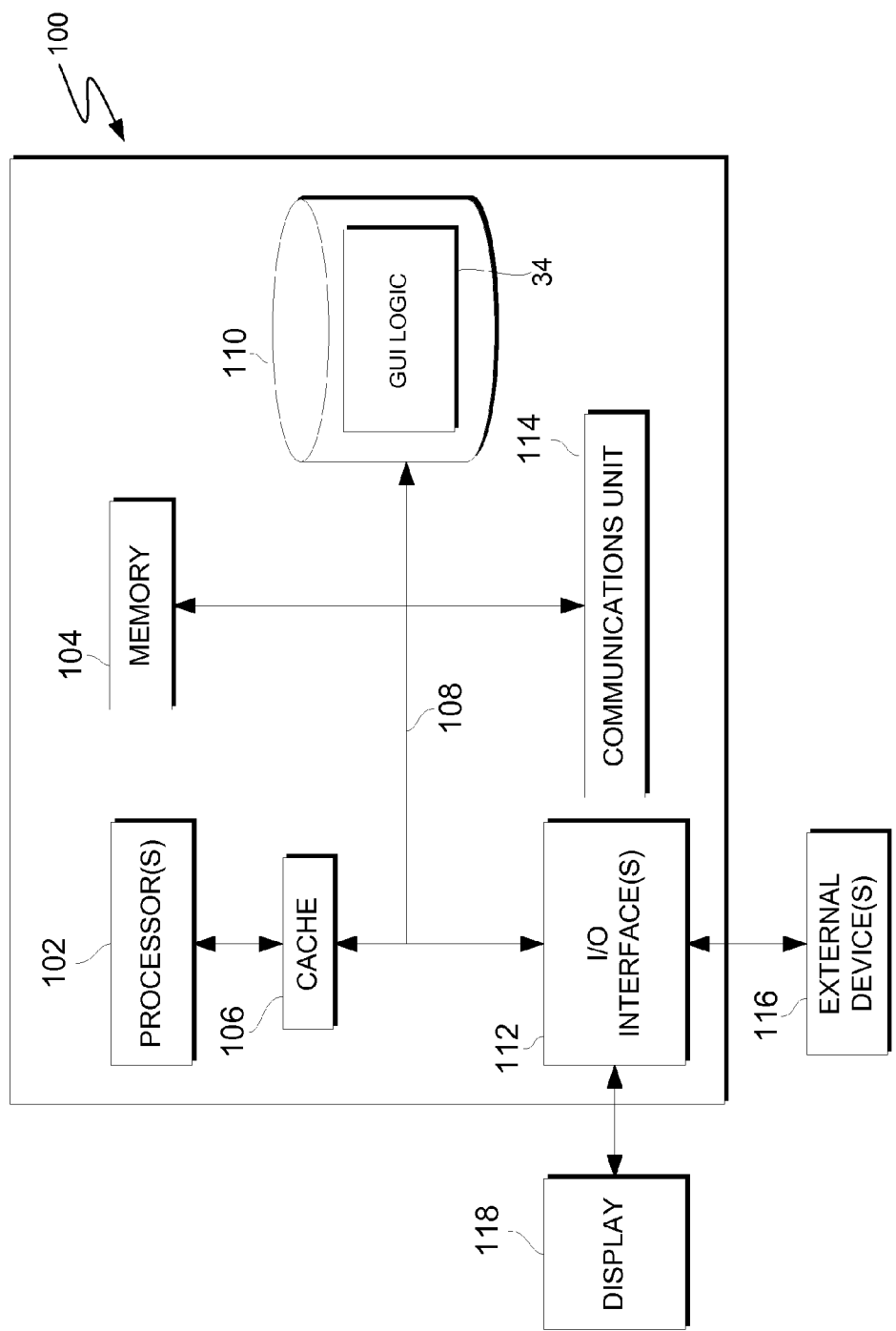
FIG. 2 is a block diagram of components of a computing device, generally designated 100, in accordance with an embodiment of the present invention.

FIG. 2 is a block diagram of components of a computing device, generally designated 100, in accordance with an embodiment of the present invention. In various embodiments, computing system 100 is representative of a computing device of hierarchical system 30 within computing environment 10, in which case computing device 100 includes diagnostic software 32 and GUI logic 34.

It should be appreciated that FIG. 2 provides only an illustration of one implementation and does not imply any limitations with regard to the environments in which different embodiments may be implemented. Many modifications to the depicted environment may be made. In other embodiments, for example, computing system 100 is representative of system administrator console 20. In such embodiments, system administrator console 20 is a computing device that executes GUI logic 34 locally based, at least in part, on communications with hierarchical system 30 (e.g., information collected by diagnostic software 32) and/or user input events.

Computing system 100 includes processor(s) 102, cache 106, memory 104, persistent storage 110, input/output (I/O) interface(s) 112, communications unit 114, and communications fabric 108. Communications fabric 108 provides communications between cache 106, memory 104, persistent storage 110, communications unit 114, and input/output (I/O) interface(s) 112. Communications fabric 108 can be implemented with any architecture designed for passing data and/or control information between processors (such as microprocessors, communications and network processors, etc.), system memory, peripheral devices, and any other hardware components within a system. For example, communications fabric 108 can be implemented with one or more buses or a crossbar switch.

Memory 104 and persistent storage 110 are computer readable storage media. In this embodiment, memory 104 includes random access memory (RAM). In general, memory 104 can include any suitable volatile or non-volatile computer readable storage media. Cache 106 is a fast memory that enhances the performance of processor(s) 102 by holding recently accessed data, and data near recently accessed data, from memory 104.

Program instructions and data (e.g., program instructions and data representing GUI logic 34 and/or graphical user interface 22) used to practice embodiments of the present disclosure may be stored in persistent storage 110 and in memory 104 for execution by one or more of the respective processor(s) 102 via cache 106. In an embodiment, persistent storage 110 includes a magnetic hard disk drive. Alternatively, or in addition to a magnetic hard disk drive, persistent storage 110 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 110 may also be removable. For example, a removable hard drive may be used for persistent storage 110. Other examples include optical and magnetic disks, thumb drives, and smart cards that are inserted into a drive for transfer onto another computer readable storage medium that is also part of persistent storage 110.

Communications unit 114, in these examples, provides for communications with other data processing systems or devices. In these examples, communications unit 114 includes one or more network interface cards. Communications unit 114 may provide communications through the use of either or both physical and wireless communications links. Program instructions and data used to practice embodiments of the present invention may be downloaded to persistent storage 110 through communications unit 114.

I/O interface(s) 112 allows for input and output of data with other devices that may be connected to computer system 100. For example, I/O interface(s) 112 may provide a connection to external device(s) 116 such as a keyboard, keypad, a touch screen, and/or some other suitable input device. External device(s) 116 can also include portable computer readable storage media such as, for example, thumb drives, portable optical or magnetic disks, and memory cards. Software and data used to practice embodiments of the present invention can be stored on such portable computer readable storage media and can be loaded onto persistent storage 110 via I/O interface(s) 112. I/O interface(s) 112 also connect to display 118.

Display 118 provides a mechanism to display or present data to a user and may be, for example, a computer monitor.

FIGS. 3-10 depict various aspects of graphical user interface 22, wherein hierarchical system 30 is a system for analyzing streaming data, in accordance with various embodiments of the present disclosure. This system for analyzing streaming data includes a plurality of physical computing "resources." In FIGS. 3-10, for example, a "resource" represents one or more physical computing devices (e.g., a personal computer) or one or more host machines running a plurality of virtual machines. Each resource executes one or more "instances." An "instance" represents an application that is deployed on a "resource" of the hierarchical system to provide a user with information based, at least in part, on one or more streams of data. In the embodiments depicted in FIGS. 3-10, each "instance" includes one or more "jobs." A "job" represents a plurality of processes that an "instance" executes in order to analyze the streaming data in accordance with a specific purpose. A user and/or system administrator of hierarchical system 30 can start and stop jobs as desired. A "job" is executed on one or more "processing elements" (PEs). A "processing element" is a virtualized processing resource. Based, for example, on the relative importance of various "jobs," a user and/or system administrator can provision the computing resources of the "resource" that executes the "jobs" by allocating different counts of processing elements to the various "jobs." Each "job" utilizes one or more "operators" to analyze the streaming data. An "operator" represents one or more processes of the "instance" that a processing element is executing. Each operator analyzes one or more "streams" of data that hierarchical system 30 accepts as an input. It should be appreciated that the hierarchical system represented in FIGS. 3-10 provides only an illustration of one implementation of the graphical user interface depicted in FIGS. 3-10 and does not imply any limitations with regard to the types of hierarchical systems for which various embodiments can be implemented.

While FIGS. 3-10 describe various features of graphical user interface 22 and GUI logic 34 with respect to specific object buttons (i.e., an object button that represents the "instances" of hierarchical system 30), graphical user interface 22 and GUI logic 34 provides object buttons that are not specifically referenced with similar functionality. Such functionality can be modified based, at least in part, on the objects that the non-referenced buttons represent.

Figure 3:
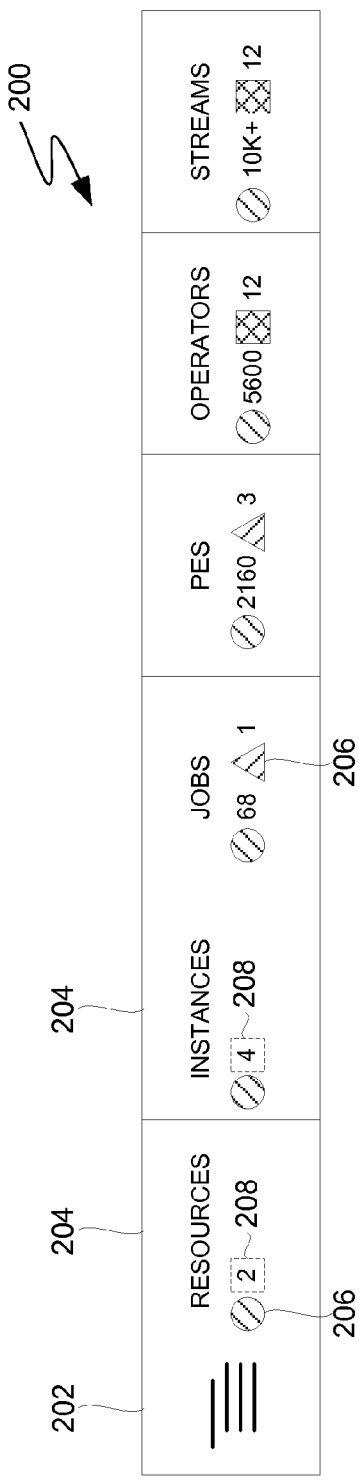
FIG. 3 is a block diagram depicting a graphical user interface that represents a hierarchical system as a horizontal bar, in accordance with an embodiment of the present disclosure.

FIG. 3 is a block diagram depicting a graphical user interface that represents a hierarchical system as a horizontal bar, in accordance with an embodiment of the present disclosure. In the embodiment depicted in FIG. 3, navigation bar 200 represents hierarchical system 30 as a horizontal series of buttons. Navigation bar 200 includes domain button 202 and a plurality of object buttons 204. Each of object buttons 204 is associated with a type of object in hierarchical system 30. In this embodiment, object buttons 204 are arranged hierarchically from left to right in accordance with the organization of hierarchical system 30. As described herein, the hierarchical system depicted described in FIG. 3-10 can be represented as a collection of resources at a coarse level of granularity and a collection of individual streams of data at a fine level of granularity. Accordingly: an object button that is associated with the "streams" is subordinate to an object button that is associated with the "operators;" the object button that is associated with the "operators" is subordinate to an object button that is associated with the "processing elements" (PEs); the object button that is associated with the "processing elements" is subordinate to an object button that is associated with the "jobs;" the object button that is associated with the "jobs" is subordinate to an object button that is associated with the "instances;" and the object button that is associated with the "instances" is subordinate to an object button that is associated with the "resources" of the hierarchical system. In other words, each of object buttons 204 is associated with a level in a hierarchy that described hierarchical system 30, and a user of graphical user interface 22 can navigate the levels of the hierarchy using object buttons 204. As discussed in greater detail with respect to FIGS. 5 and 9, domain button 202 is associated with hierarchical system 30 as a whole and can be used to navigate to any level of hierarchical system 30 while maintaining any filter that is applied to object buttons 204.

In the embodiment depicted in FIG. 3, object buttons 204 also present information relating to the health of the objects that are associated with the respective buttons. In FIG. 3, for example, object buttons 204 include object health indicators 206 that utilize circles, triangles, and squares to indicate the health of various objects. In this embodiment, a circle indicates that one or more objects are functioning "normally," a triangle indicates that one or more objects are functioning "subnormally," and a square indicates that one or more object are non-functional. An object button can include one, two, or three object health indicators based, at least in part, on the statuses of the associated objects. As discussed with respect to FIG. 1, diagnostic software 32 can determine whether or not an object is functioning "normally" or "subnormally" by comparing a measured parameter to a performance threshold for the respective parameter and communicate this information to GUI logic 34 for display on graphical user interface 22. In some embodiments, different shapes are used to differentiate categories of healthiness. Alternatively or in addition to shapes, colors can be used to differentiate categories of healthiness. For example, green, yellow, and red object health indicators 206 can be used to respectively indicate object(s) that are functioning "normally," object(s) that functioning "subnormally," and object(s) that are non-functional. In the embodiment depicted in FIG. 3, object counts 208 are associated with each object health indicator 206. Each of object counts 208 presents a count of objects that are associated with a respective object health indicator.

Figure 4:
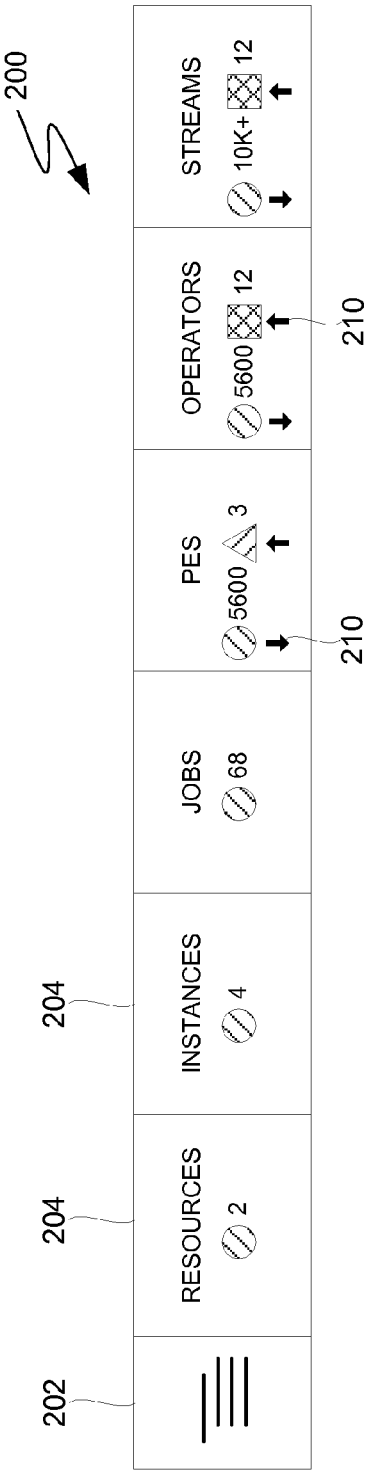
FIG. 4 is a block diagram depicting a graphical user interface that represents a hierarchical system as a horizontal bar that includes trends indicators, in accordance with an embodiment of the present disclosure.

FIG. 4 is a block diagram depicting a graphical user interface that represents a hierarchical system as a horizontal bar that includes trends indicators, in accordance with an embodiment of the present disclosure. In the embodiment depicted in FIG. 4, object buttons 204 include trend indicators 210. Navigation bar 200 includes one or more trend indicators based, at least in part, on information collected by diagnostic software 32. Trend indicators 210 represent changes in object counts 208. In some embodiments, one or more of object buttons 204 will include trend indicators 210 and associate the trend indicator with object health indicators 206 if a respective object count changes during a predetermined period of time. In other embodiments, trend indicators 210 reflect changes in respective object counts in real-time.

In the embodiment depicted in FIG. 4, trend indicators 210 are arrows that point either up or down based on the direction of a trend. For example, the health status indicators of the "processing element" button are respectively associated with a downward-pointing arrow to indicate that the count of normally-functioning "processing elements" (PEs) has decreased and an upward-pointing arrow to indicate that the count of subnormally-functioning "processing elements" has increased. The health-status indicators of the "operators" button and the "streams" button are similarly associated with trend indicators 210. In the embodiment depicted in FIG. 4, trend indicators 210 are not displayed if a trend does not exist. In some embodiments, GUI logic 34 determines that no trend exists if the change in an object count 208 is zero over a period of time. In other embodiments, GUI logic 34 determines that no trend exists if the change in an object count 208 is below a threshold count over a period of time. In FIG. 3, the "resources" button, the "instances" button, and the "jobs" button do not include trend indicators because respective trends do not exist. In other embodiments, object buttons 204 can include a trend indicator 210 that indicates that no trend exists (e.g., a horizontal line).

Figure 5:
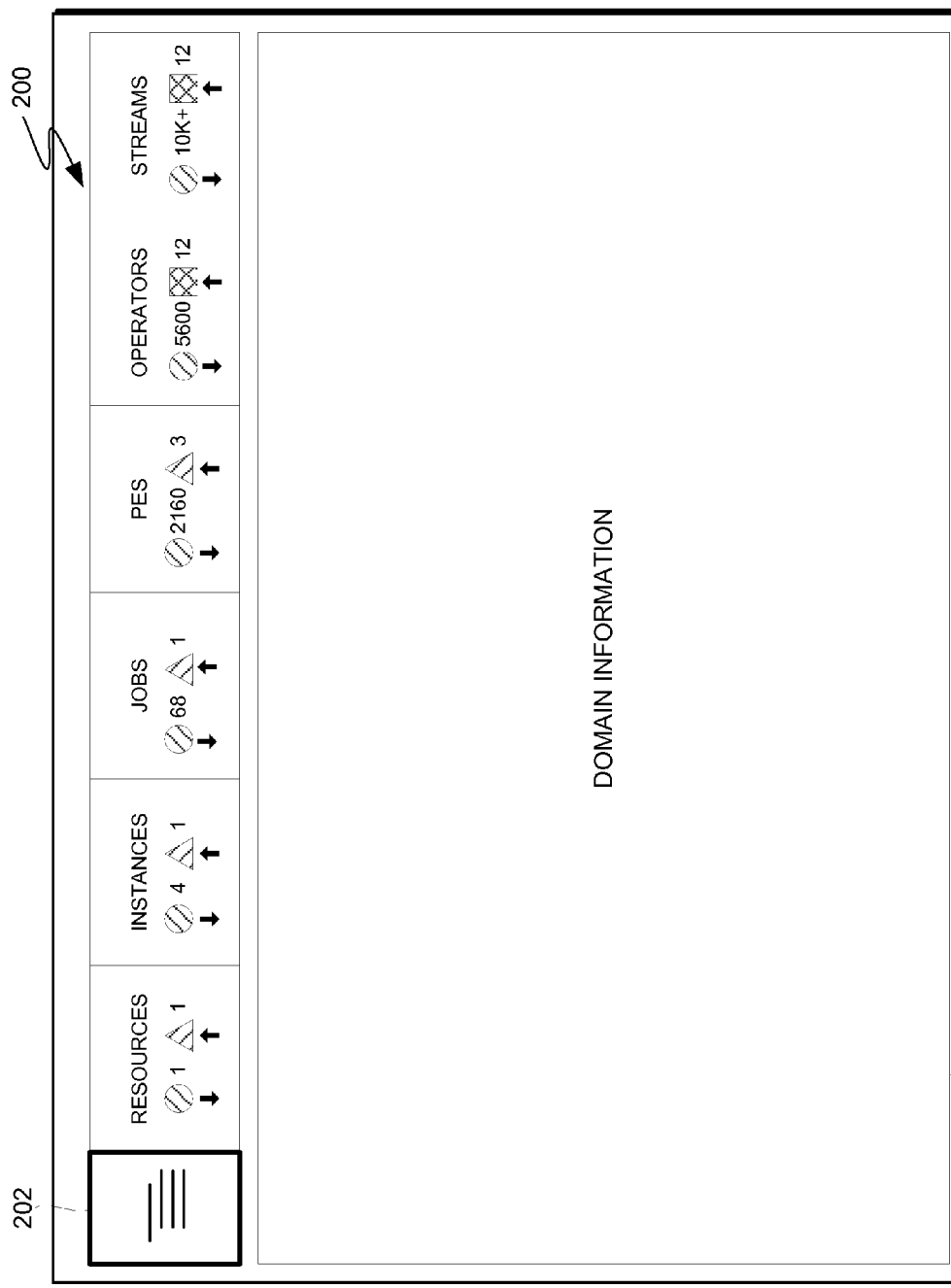
FIG. 5 is a block diagram depicting a graphical user interface that represents a hierarchical system as a horizontal bar and includes detailed information relating to the hierarchical system a whole, in accordance with an embodiment of the present disclosure.

FIG. 5 is a block diagram depicting a graphical user interface that represents a hierarchical system as a horizontal bar and includes detailed information relating to the hierarchical system a whole, in accordance with an embodiment of the present disclosure. In the embodiment depicted in FIG. 5, graphical user interface 22 presents navigation bar 200 and window 214 on screen 212. Window 214 is a window that displays detailed information that can include information relating to hierarchical system 30 as a whole, a specific type of object within hierarchical system 30 (e.g., information relating to all "instances" of hierarchical system 30), or a specific object within hierarchical system 30 (e.g., information relating to a specific "instance"). In some embodiments, window 214 includes a plurality of panes and/or widgets for displaying different types of information (e.g., alerts, lists of relevant objects, and or graphs) based, at least in part, on user input events. In the embodiment depicted in FIG. 5, window 214 displays information relating to hierarchical system 30 as a whole (i.e., "domain information") based, at least in part, on a user input event that selected domain button 202. In the embodiments depicted in FIGS. 5-10, a heavy stoke around the border of a button (i.e. domain button 202 or one of object buttons 204) indicates that the button is selected.

Figure 6:
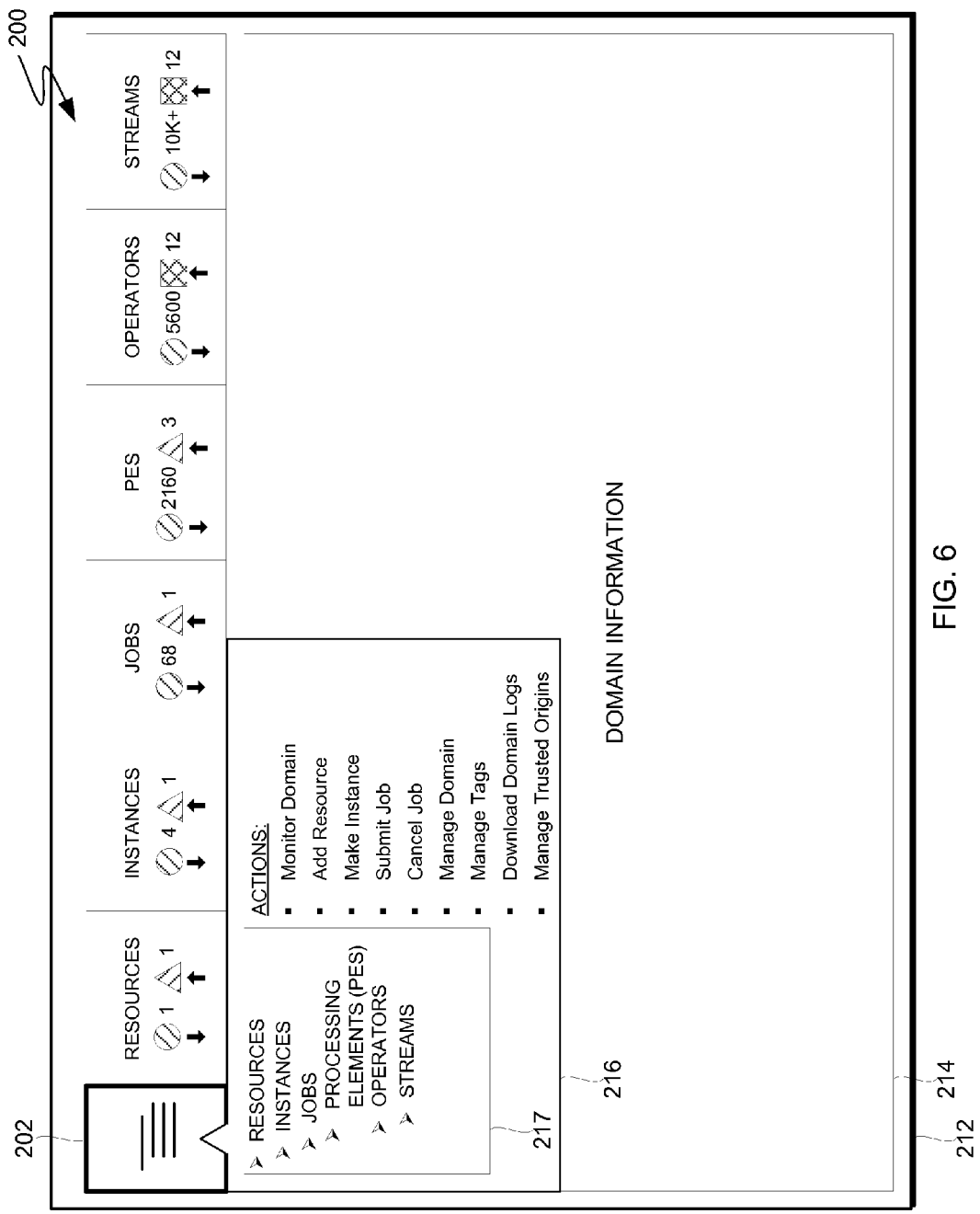
FIG. 6 is a block diagram depicting a graphical user interface that includes a button that enables a user to monitor and manage the system as a whole, in accordance with an embodiment of the present disclosure.

FIG. 6 is a block diagram depicting a graphical user interface that includes a button that enables a user to monitor and manage the system as a whole, in accordance with an embodiment of the present disclosure. In the embodiment depicted in FIG. 6, graphical user interface 22 presents domain menu 216 in response to a hover over domain button 202. Domain menu 216 enables a user of graphical user interface 22 to monitor and/or manage hierarchical system 30 by selecting from among a plurality of actions that are available through domain menu 216 (e.g., adding a resource, making an instance, or submitting a job). Domain menu 216 also includes tree 217. Tree 217 is an expandable, indented outline of hierarchical system 30. Tree 217 allows a user of graphical user interface 22 to navigate to any object of hierarchical system 30 regardless of any filters applied through navigation bar 200, as discussed with respect to FIG. 9. The user can expand the various levels of tree 217 to show labels that are associated with one or more specific object. The user can select a specific object from tree 217 in order to monitor and/or mange the specific object through window 214.

Figure 7:
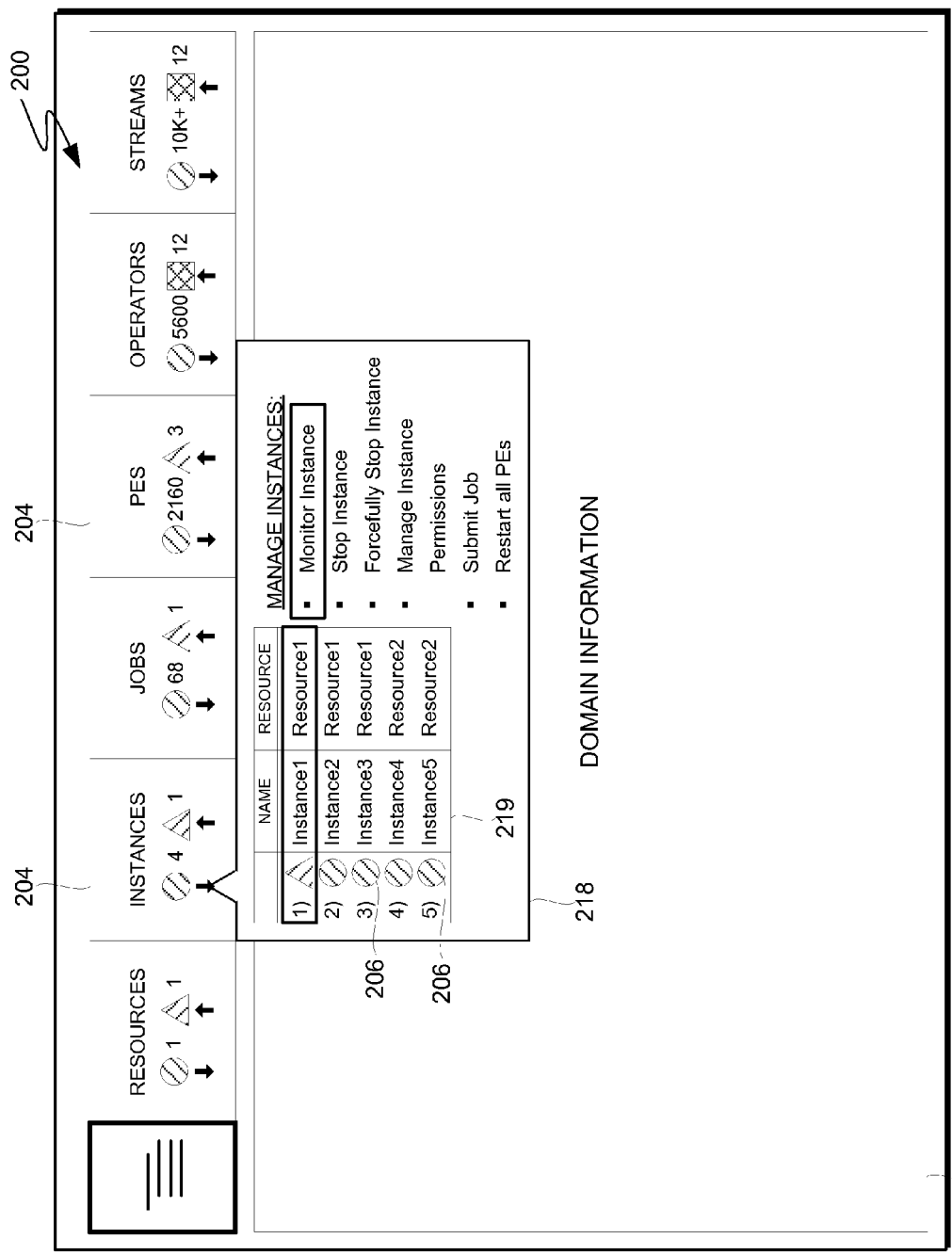
FIG. 7 is a block diagram depicting a graphical user interface that includes menus for managing various types of objects in a hierarchical system, in accordance with an embodiment of the present disclosure.

FIG. 7 is a block diagram depicting a graphical user interface that includes menus for managing various types of objects in a hierarchical system, in accordance with an embodiment of the present disclosure. In the embodiment depicted in FIG. 7, graphical user interface 22 presents "instances" menu 218 in response to a hover over the object button 204 that represents the "instances" of hierarchical system 30. "Instances" menu 218 enables a user of graphical user interface 22 to monitor and/or manage various "instances" of hierarchical system 30 by selecting from among a plurality of actions that are available through "instances" menu 218 (e.g., monitor an "instance," stopping an "instance," or managing an "instance"). "Instances" menu 218 includes list 219. List 219 lists specific "instances" in hierarchical system 30. In addition to the names of various "instances," list 219 associates each "instance" with the "resource" that it is subordinate (i.e., related) to and an object health indicator 206 that indicates the heath of the "instance." In some embodiments, list 219 organizes the various "instances" that appear in list 219 using object health indicators 206 such that "instances" that are non-functional appear first and "instances" that are functioning subnormally appear before "instances" that are functioning normally. FIG. 7 shows that a user of graphical user interface 22 has selected "Instance 1" in list 219 and the "monitor instance" option from "instances" menu 218. Graphical user interface 22 presents similar menus in response to hovers over the object buttons 204 that represents the resources, jobs, processing elements, operators, and streams of hierarchical system 30. Accordingly, object buttons 204 provide a summary of the status of hierarchical system 30 at all levels and provide a means for quickly navigating to any object of hierarchical system 30.

FIG. 7 depicts graphical user interface 22 prior to GUI logic 34 executing an instruction to monitor the selected "instance" (i.e., "Instance1"). Accordingly, graphical user interface 22 presents "domain information" in window 214 based, at least in part, on the selection of domain button 202.

Figure 8:
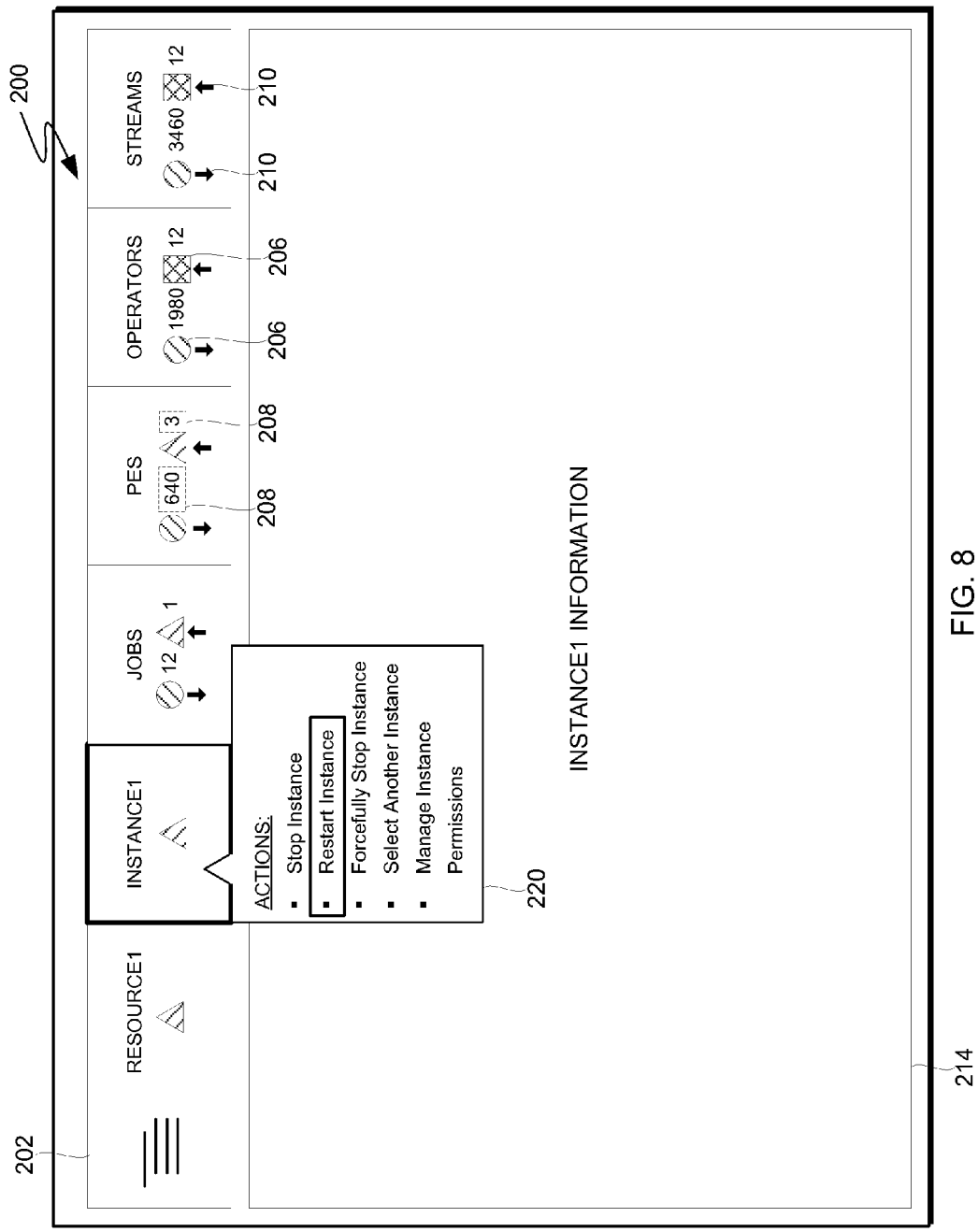
FIG. 8 is a block diagram depicting a graphical user interface that includes menus for managing specific objects in a hierarchical system, in accordance with an embodiment of the present disclosure.

FIG. 8 is a block diagram depicting a graphical user interface that includes menus for managing specific objects in a hierarchical system, in accordance with an embodiment of the present disclosure. In the embodiment depicted in FIG. 8, one or more filters are applied to the information presented in navigation bar 200 in order to reflect the selection of a specific object of hierarchical system 30. In response to the selection of a specific object, GUI logic 34 identifies the objects of hierarchical system 30 that are subordinate to (i.e., descendants of) the selected object and provides graphical user interface 22 with instructions that describe how to present navigational bar 200 such that information relating to objects that are not subordinate (i.e., unrelated) to the selected object is not presented on object buttons 204. In FIG. 8, for example, the object button that represents the "instances" of hierarchical system 30 is relabeled to indicate that "Instance1" of hierarchical system 30 is selected. In addition, object counts 208 are lower in FIG. 8 compared to FIG. 7 because the information presented on object buttons 204 is associated with only those objects that are subordinate to "Instance1." In other words, a filter is applied to object buttons 204 that are subordinate to (i.e., "downstream" from) the object button that identifies the selected object. The filter is similarly applied to object health indicators 206 and trend indicators 210. When a user of graphical user interface 22 hovers over a subordinate object button, graphical user interface 22 presents a menu that includes a list of specific objects and related controls (e.g, a menu that is analogous to "instances" menu" 218) that is filtered to show only those objects of a respective type that are subordinate to the selected objected (e.g., "Instance1").

In some embodiments, a filter is also applied to object buttons 204 that are superordinate to (i.e., "upstream" from) the object button that identifies the selected object. In FIG. 8, for example, a filter is applied to the object button that represents the "resources" of hierarchical system 30, and in response, the object button is relabeled to identify the specific "resource" that "Instance1" is subordinate to. In other words, the embodiment depicted in FIG. 8 shows that "Resource1" is a direct ancestor to "Instance 1." In some embodiments, object buttons 204 are not relabeled if there is more than one direct ancestor to a selected object. In such embodiments, the list of respective objects (i.e., the list of objects that appears in response to a hover over an object button) is filtered to show only those objects that the selected object is subordinate to. Navigational bar 200 advantageously depicts the relationship between superordinate objects and a selected object (i.e., the ancestry of the selected object) while a user of graphical user interface 22 monitors and/or manages the selected object. In other embodiments, however, no filters are applied to superordinate, "upstream" object buttons and such buttons present information relating to all objects of respective types in hierarchical system 30.

In the embodiment depicted in FIG. 8, graphical user interface 22 also presents object menu 220 in response to a hover over an object button that identifies a specific, selected object. Object menu 220 enables a user of graphical user interface 22 to manage the selected object by selecting from among a plurality of actions that are available through object menu 220 (e.g., stopping an the selected object and restarting the selected object). FIG. 8 shows that a user of graphical user interface 22 has selected the "Restart Instance" action from object menu 220. A user of graphical user interface 22 can select the "Select Another Instance" action from object menu 220 to cause graphical user interface 22 to present "Instances" menu 218, from which the user can select a different instance (i.e., a menu from which the user can select a different object).

Figure 9:
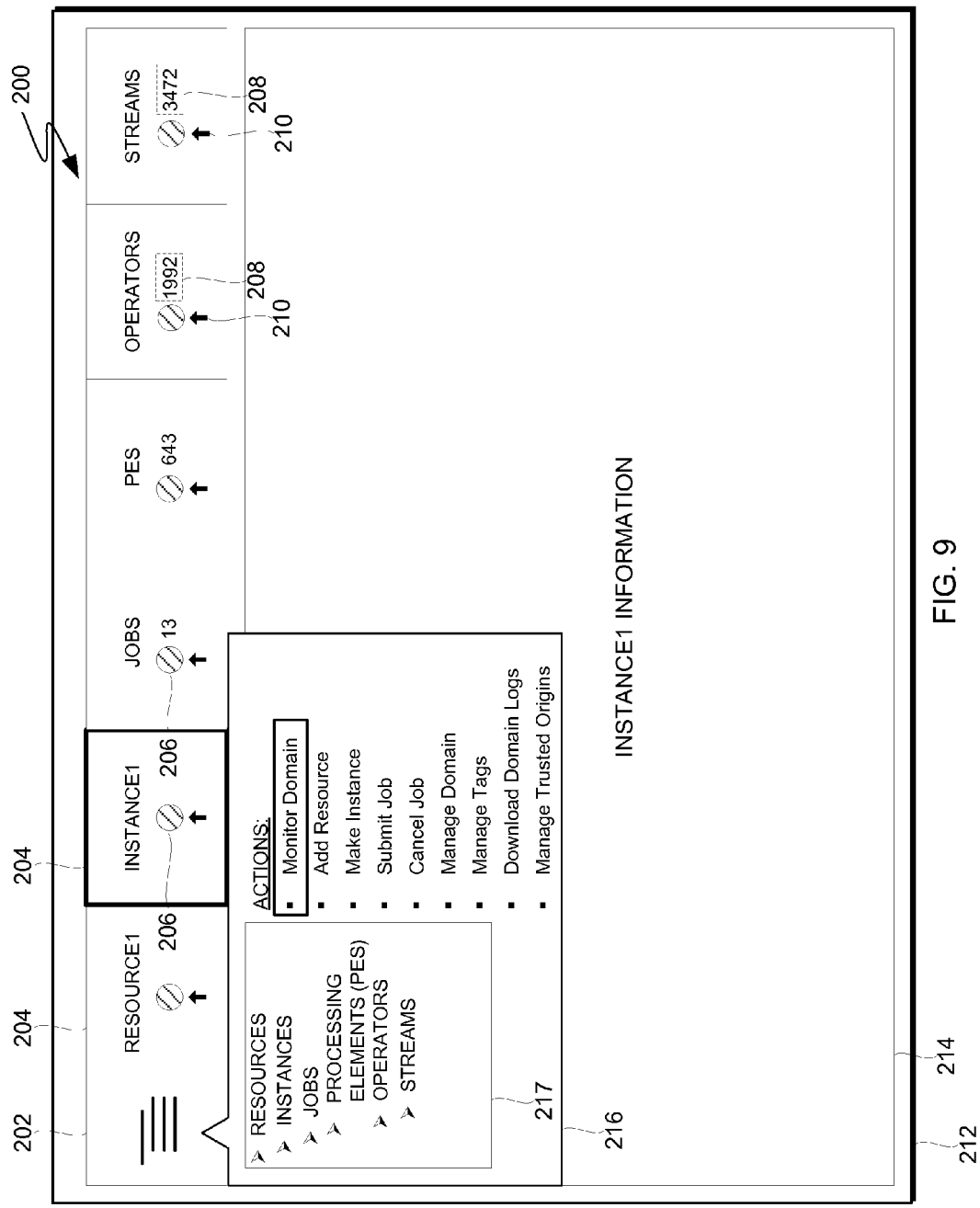
FIG. 9 is a block diagram depicting changes in object health indicators and trend indicators of a graphical user interface in response to managing a hierarchical system, in accordance with an embodiment of the present disclosure.

FIG. 9 is a block diagram depicting changes in object health indicators and trend indicators of a graphical user interface in response to managing a hierarchical system, in accordance with an embodiment of the present disclosure. In the embodiment depicted in FIG. 9, object buttons 204 reflect the statuses of various objects of hierarchical system 30 following a restart of "Instance1." For example, object health indicators 206 indicate that all objects that are subordinate or superordinate to "Instance1" are functioning "normally" following the restart of "Instance1." Similarly, object counts 208 and trend indicators 210 indicate that a greater number of various objects are functioning "normally" compared to the state of hierarchical system 30 as shown in FIG. 8.

In the embodiment depicted in FIG. 9, navigation bar 200 indicates that "Instance1" is selected. As discussed with respect to FIG. 8, one or more filters are applied to navigation bar 200 in response to the selection of a specific object, such as "Instance1." In addition, window 214 presents detailed information relating to "Instance1" in response to the selection of the specific object. Various embodiments of the present disclosure advantageously enable a user of graphical interface 22 to actively filter navigation bar 200 and view detailed information pertaining to a specific object or type of object while navigating to any object, including unrelated objects, within hierarchical system 30. Domain button 202 provides this functionality. While actively filtering navigational bar 200 and viewing information in window 214, a user of graphical user interface 22 can hover over domain button 202 and cause graphical user interface 22 to present domain menu 216 on screen 212. As discussed with respect to FIG. 6, tree 217 enables the user of graphical user interface 22 to navigate to any object of hierarchical system 30 without removing any filters that are being applied to the information presented on object buttons 204.

In FIG. 9, the user of graphical user interface 22 had selected the "Monitor Domain" action from domain menu 216.

Figure 10:
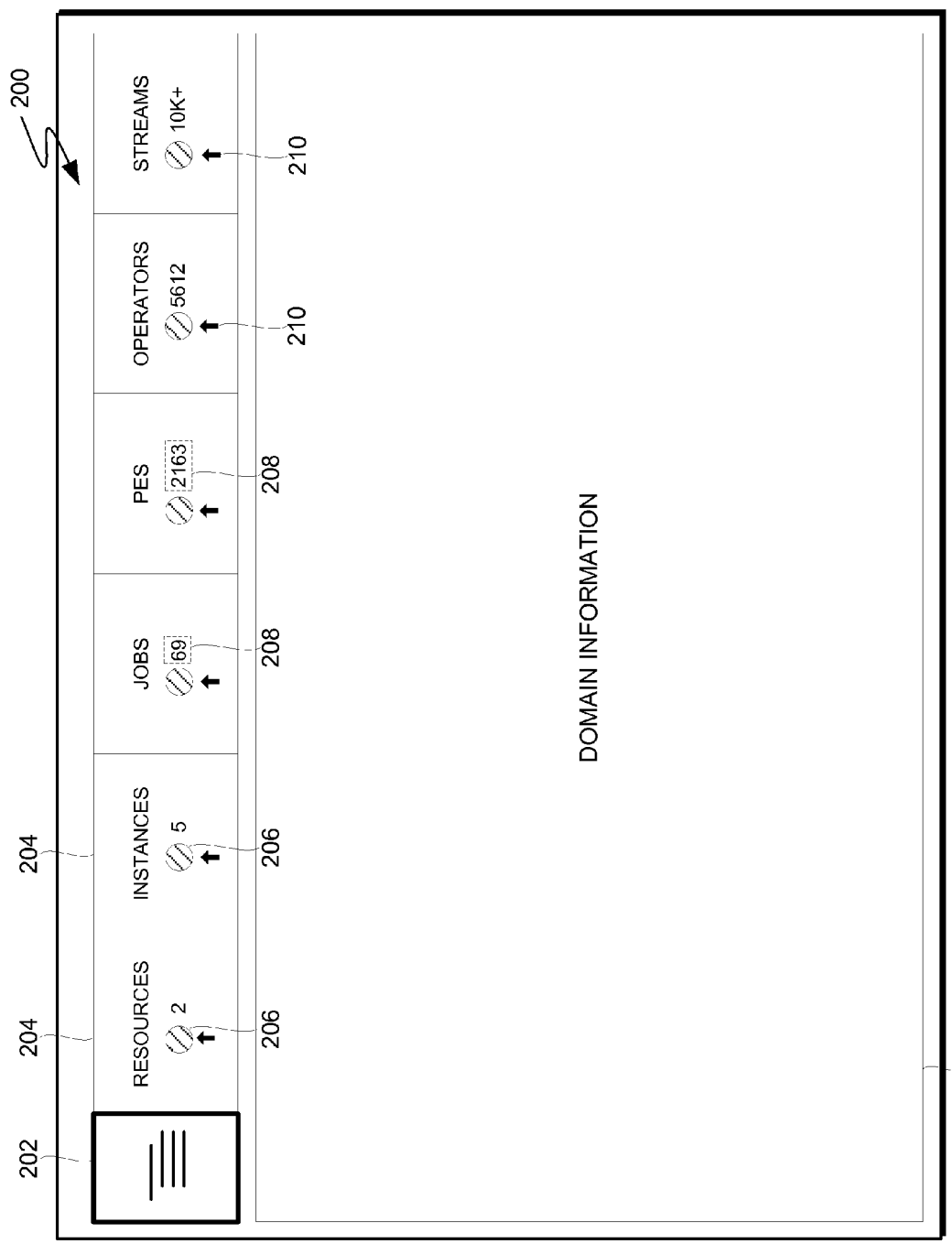
FIG. 10 is a block diagram depicting a graphical user interface that presents information relating to a hierarchical system as a whole, in accordance with an embodiment of the present disclosure.

FIG. 10 is a block diagram depicting a graphical user interface that presents information relating to a hierarchical system as a whole, in accordance with an embodiment of the present disclosure. In the embodiment depicted in FIG. 10, object buttons 204 summarize the status of hierarchical system 30 as whole in response to the selection of the "Monitor Domain action, as depicted in FIG. 9. For example, object health indicators 206, object counts 208, and trend indicators 210 now describe hierarchical system 30 as a whole instead of only the objects that are subordinate or superordinate to a selected object, as depicted in FIGS. 8 and 9. Similarly, window 214 presents information pertaining to hierarch system 30 a whole (i.e., "domain mamation") instead of information pertaining "Instance1."

Figure 11:
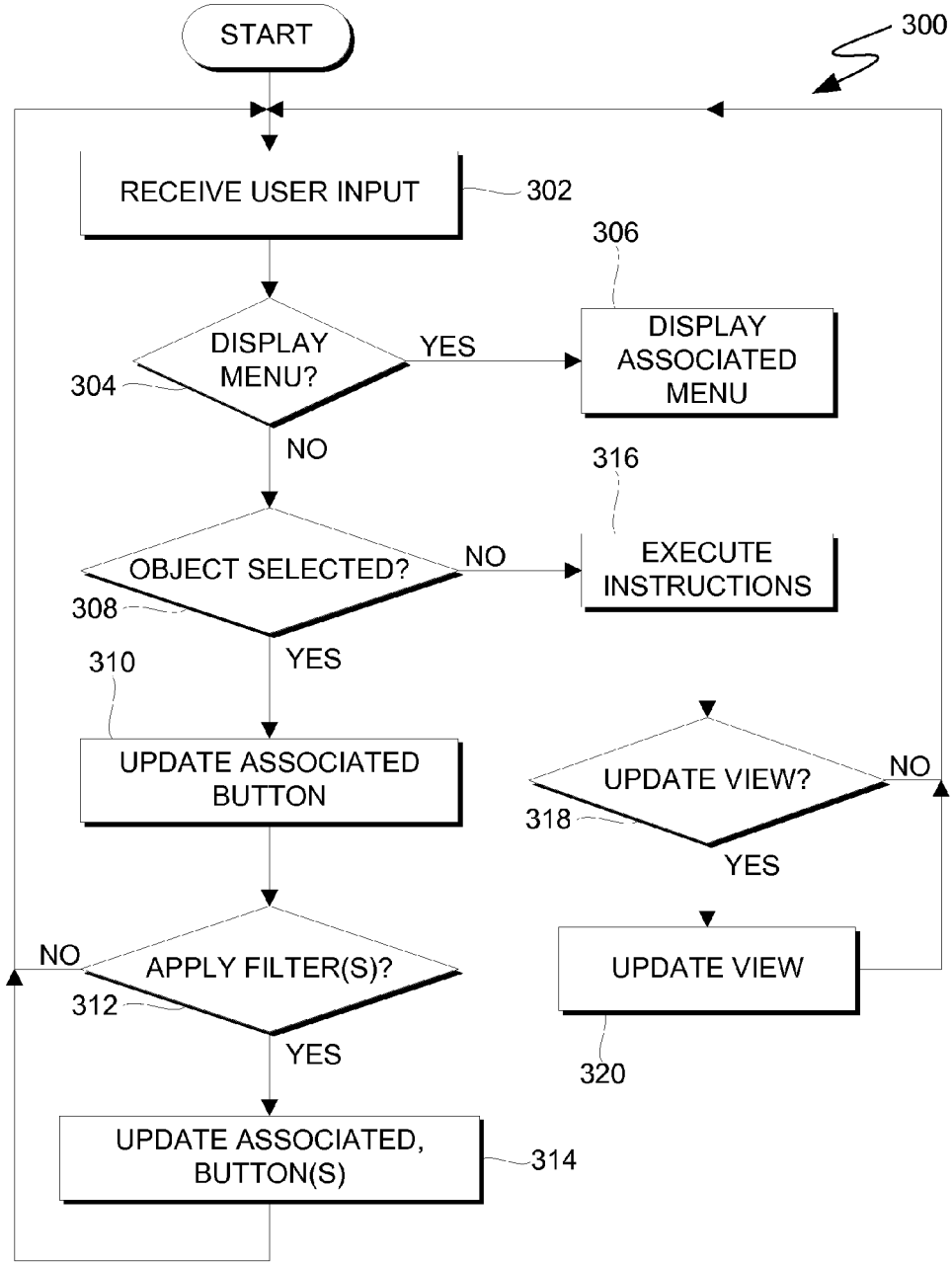
FIG. 11 is a flowchart depicting operations for presenting a graphical user interface, on a computing device within the computing environment of FIG. 1, in accordance with an embodiment of the present invention.

FIG. 11 is a flowchart depicting operations for presenting a graphical user interface, on a computing device within the computing environment of FIG. 1, in accordance with an embodiment of the present invention. For example, FIG. 11 is a flowchart depicting operations 300 of GUI logic 34 on hierarchical system 30 within computing environment 10.

In operation 302, GUI logic 34 receives user input from a user of graphical user interface 22. GUI logic 34 performs various action based, at least in part, on the nature of the user input. If, for example, GUI logic 34 determines that the user input is an instruction to display a menu (e.g., a hover over domain button 202 or one of object buttons 204; decision 204, YES branch), GUI logic 34 instructs graphical user interface 22 to present an associated menu on screen 212 (operation 306). If GUI logic 34 determines that the user input is not an instruction to display a menu (decision 204, NO branch), GUI logic 34 makes one or more additional attempts to characterize the user input.

In decision 308, GUI logic 34 determines whether or not the user input is a selection of a specific object (e.g., selecting "Instance1," as described with respect to FIG. 7).

If GUI logic 34 determines that the user has selected a specific object (decision 308, YES branch), GUI logic 34 instructs graphical user interface 22 to update the presentation of the associated button in navigation bar 200. For example, GUI logic 34 can instruct graphical user interface 22 to label the associated button so that it identifies the selected object and remove trend indicators 210 from the associated button. If GUI logic 34 determines that the user input is neither an instruction to display a menu nor a selection of a specific object (e.g., the user input is an instruction to restart an "instance;" decision 308, NO branch), GUI logic 34 executes the instruction on hierarchical system 30 and/or graphical user interface 22 (operation 316). If GUI logic 34 determines that the view presented on graphical user interface 22 can be updated in response to executing the instruction (decision 318, YES branch), GUI logic 34 instructs graphical user interface 22 to update the view (e.g., update navigational bar 200 and/or window 214 based, at least in part, on changes in the status of hierarchical system 30 resulting from the executed instruction; operation 320). If GUI logic 34 determines that the view presented on graphical user interface 22 cannot be updated (decision 318, NO branch), GUI logic 34 waits to receive user input (operation 302).

In decision 312, GUI logic 34 determines whether or not one or more filters can be applied object buttons 204 in response to a selection of a specific object. Accordingly, GUI logic 34 can identify objects that are subordinate and/or superordinate (i.e., related) to a selected object, as discussed with respect to FIG. 8. If GUI logic 34 determines that one or more filters can be applied to object buttons 204 (decision 312, YES branch), GUI logic 34 applies the filter(s) and instructs graphical user interface 22 to update the presentation of object buttons 204 in accordance with the applied filter(s), as discussed with respect to Figure (operation 314). If GUI logic 34 determines that one or more filters cannot be applied to object buttons 204 (decision 312, NO branch), GUI logic 34 waits to receive user input (operation 302).

In some embodiments, the functionality of GUI logic 34 is provided by a plurality of logical units. For example, a "controller" and logical units associated with each of object buttons 204 could provide, at least in part, the functionality of GUI logic 34. In embodiments where the "controller" is aware of the structure of navigation bar 200 (i.e., the dependencies and relationships between object buttons 204), the controller filters information that is passed to object buttons 204 based, at least in part, on a selected button (i.e., a select object or type of object). In such embodiments, logical units associated with respective object buttons publish events when they are selected by a user of graphical user interface 22. Non-selected object buttons listen for events and update the information presented the respective object buttons based, at least in part, on a filter that is applied in response to the selection of the relevant object button (i.e., based on a selection of a specific object). In addition, a logic unit associated with window 14 updates the information presented in window 14 based, at least in part, on the selected object button.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

As used herein, a list of alternatives such as "at least one of A, B, and C" should be interpreted to mean "at least one A, at least one B, at least one C, or any combination of A, B, and C."

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing a hierarchical system via a graphical user interface, the method comprising:
   presenting, by one or more computer processors, a graphical user interface that includes a navigation bar, the navigation bar including a domain element and a plurality of object elements, wherein:
      the domain element provides a domain menu that represents a hierarchal system of a plurality of objects such that a user of the graphical user interface can navigate to any object of the hierarchal system by, at least in part, activating the domain element;
      each object element is associated with a different object type and represents one or more respective objects of the plurality of objects in the hierarchical system; and
      the plurality of object elements is arranged in an order based, at least in part, on the hierarchical system;
   presenting, by one or more computer processors, a first menu in response to detecting an interaction with a first object element of the plurality of object elements, wherein the first object element is associated with a first object type in the hierarchical system and wherein the first menu includes a list of objects of the first object type;
   filtering, by one or more computer processors, information presented on a second object element of the plurality of object elements in response to receiving a selection of a specific object via the first menu, wherein:
      the second object element is associated with a second object type, and wherein type in the hierarchical system;
      information pertaining to one or more objects that are (i) related to the specific object and (ii) of the second object type is presented on the second object element while information representing objects of the second object type that are unrelated to the specific object is omitted from the second object element as a result of the filtering; and
      objects of the second object type are subordinate to objects of the first object type within the hierarchical system such that the one or more objects of the second object type that are related to the specific object are subordinate to the specific object and represent every object of the second object type within the hierarchical system that is subordinate to the specific object;
   filtering, by one or more computer processors, information presented on a third object element in response to the specific object being selected via the first menu, wherein:
      the third object element is associated with objects of a third object type in the hierarchical system;
      information pertaining to one or more objects that are (i) related to the specific object and (ii) of the third object type is presented on the third object element while information representing objects of the third object type that are unrelated to the specific object is omitted from the third object element as a result of the filtering; and objects of the third object type are subordinate to (i) objects of the first object type and (ii) objects of the second object type such that the one or more objects of the third object type represent every object of the third object type within the hierarchical system that is subordinate to the specific object and the one or more objects of the second object type that are represented by the information presented on the second object element as a result of the filtering of the information presented on the second object element;

in response to filtering information presented on the second object element and filtering information presented on the third object element, presenting, by one or more computer processors, at least one of a first object health indicator, a second object health indicator, and a third object health indicator on each of the second object element and the third object element, wherein:

the first object health indicator is associated with objects that are functioning above a performance threshold and is a green circle;

the second object health indicator is associated with objects that are functioning below a performance threshold and is a yellow triangle;

the third object health indicator is associated with objects that are nonfunctional and is a red square; and wherein:

each object health indicator is associated with a respective count of associated objects; and at least one of the first object health indicator, the second object health indicator, and the third object health indicator is associated with a trend indicator that describes a change in the respective count of associated objects; and presenting, by one or more computer processors, a second menu in response to detecting an interaction with the domain element while continuing to filter information presented on the second object element, wherein the second menu includes a list all objects that are associated with the plurality of object elements.

2. A computer program product for managing a hierarchical system via a graphical user interface, the method comprising:

a computer readable storage medium and program instructions stored on the computer readable storage medium, the program instructions comprising:

program instructions to present a graphical user interface that includes a navigation bar, the navigation bar including a domain element and a plurality of object elements, wherein each object element is associated with a different object type in a hierarchical system and wherein the plurality of object elements is arranged in an order based, at least in part, on the hierarchical system;

program instructions to present a first menu in response to detecting an interaction with a first object element of the plurality of object elements, wherein the first object element is associated with a first object type in the hierarchical system and wherein the first menu includes a list of objects of the first object type;

program instructions to filter information presented on a second object element of the plurality of object elements in response to receiving a selection of a specific object via the first menu, wherein:

the second object element is associated with a second object type;

information pertaining to one or more objects that are (i) related to the specific object and (ii) of the second object type is presented on the second object element while information representing objects of the second object type that are unrelated to the specific object is omitted from the second object element as a result of the filtering; and objects of the second object type are subordinate to objects of the first object type within the hierarchical system such that the one or more objects that are of the second object type and that are related to the specific object are subordinate to the specific object and represent every object of the second object type within the hierarchical system that is subordinate to the specific object;

program instructions to filter information presented on a third object element in response to the specific object being selected via the first menu, wherein:

the third object element is associated with objects of a third object type in the hierarchical system;

information pertaining to one or more objects that are (i) related to the specific object and (ii) of the third object type is presented on the third object element while information representing objects of the third object type that are unrelated to the specific object is omitted from the third object element as a result of the filtering; and objects of the third object type are subordinate to (i) objects of the first object type and (ii) objects of the second object type such that the one or more objects of the third object type represent every object of the third object type within the hierarchical system that is subordinate to the specific object and the one or more objects of the second object type that are represented by the information presented on the second object element as a result of the filtering of the information presented on the second object element;

in response to program instructions to filter information presented on the second object element and program instructions to filter information presented on the third object element, program instructions to present at least one of a first object health indicator, a second object health indicator, and a third object health indicator on each of the second object element and the third object element, wherein:

the first object health indicator is associated with objects that are functioning above a performance threshold and is a green circle;

the second object health indicator is associated with objects that are functioning below a performance threshold and is a yellow triangle;

the third object health indicator is associated with objects that are nonfunctional and is a red square; and wherein:

each object health indicator is associated with a respective count of associated objects; and at least one of the first object health indicator, the second object health indicator, and the third object health indicator is associated with a trend indicator that describes a change in the respective count of associated objects; and program instructions to present a second menu in response to detecting an interaction with the domain element while continuing to filter information presented on the second object element, wherein the second menu includes a list all objects that are associated with the plurality of object elements.

3. A computer system for managing a hierarchical system via a graphical user interface, the computer system comprising:
one or more computer processors;
one or more computer readable storage media;
program instructions stored on the one or more computer readable storage media for execution by at least one of the one or more processors, the program instructions comprising:
program instructions to present a graphical user interface that includes a navigation bar, the navigation bar including a domain element and a plurality of object elements, wherein each object element is associated with a different object type in a hierarchical system and wherein the plurality of object elements is arranged in an order based, at least in part, on the hierarchical system;
program instructions to present a first menu in response to detecting an interaction with a first object element of the plurality of object elements, wherein:
the second object element is associated with a second object type;
information pertaining to one or more objects that are (i) related to the specific object and (ii) of the second object type is presented on the second object element while information representing objects of the second object type that are unrelated to the specific object is omitted from the second object element as a result of the filtering; and
objects of the second object type are subordinate to objects of the first object type within the hierarchical system such that the one or more objects that are of the second object type and that are related to the specific object are subordinate to the specific object and represent every object of the second object type within the hierarchical system that is subordinate to the specific object;
program instructions to filter information presented on a third object element in response to the specific object being selected via the first menu, wherein:
the third object element is associated with objects of a third object type in the hierarchical system;
information pertaining to one or more objects that are (i) related to the specific object and (ii) of the third object type is presented on the third object element while information representing objects of the third object type that are unrelated to the specific object is omitted from the third object element as a result of the filtering; and
objects of the third object type are subordinate to (i) objects of the first object type and (ii) objects of the second object type such that the one or more objects of the third object type represent every object of the third object type within the hierarchical system that is subordinate to the specific object and the one or more objects of the second object type that are represented by the information presented on the second object element as a result of the filtering of the information presented on the second object element;
in response to program instructions to filter information presented on the second object element and program instructions to filter information presented on the third object element, program instructions to present at least one of a first object health indicator, a second object health indicator, and a third object health indicator on each of the second object element and the third object element, wherein:
the first object health indicator is associated with objects that are functioning above a performance threshold and is a green circle;
the second object health indicator is associated with objects that are functioning below a performance threshold and is a yellow triangle;
the third object health indicator is associated with objects that are nonfunctional and is a red square; and wherein:
each object health indicator is associated with a respective count of associated objects; and
at least one of the first object health indicator, the second object health indicator, and the third object health indicator is associated with a trend indicator that describes a change in the respective count of associated objects; and
program instructions to present a second menu in response to detecting an interaction with the domain element while continuing to filter information presented on the second object element, wherein the second menu includes a list all objects that are associated with the plurality of object elements.

* * * * *